(12) United States Patent
Wang et al.

(10) Patent No.: US 8,837,143 B2
(45) Date of Patent: *Sep. 16, 2014

(54) HANDHELD ELECTRONIC DEVICE

(75) Inventors: Chih-Kuang Wang, Taoyuan County (TW); Tsung-Yuan Ou, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 215 days.

This patent is subject to a terminal disclaimer.

(21) Appl. No.: 13/304,422

(22) Filed: Nov. 25, 2011

(65) Prior Publication Data

US 2013/0135794 A1    May 30, 2013

(51) Int. Cl.
| | | |
|---|---|---|
| H05K 5/00 | (2006.01) | |
| H05K 7/00 | (2006.01) | |
| G06F 1/16 | (2006.01) | |

(52) U.S. Cl.
USPC ............. 361/679.56; 361/802; 361/679.01

(58) Field of Classification Search
USPC ........... 361/829, 679.55, 679.3, 679.09, 802, 361/679.56, 679.01, 801; 455/567, 566; 312/223.1, 223.2
See application file for complete search history.

(56) References Cited

U.S. PATENT DOCUMENTS

| | | | | |
|---|---|---|---|---|
| 5,550,712 | A * | 8/1996 | Crockett ..................... | 361/752 |
| 6,061,231 | A * | 5/2000 | Crockett ................... | 361/679.26 |
| 6,865,076 | B2 * | 3/2005 | Lunsford ................. | 361/679.56 |
| 7,148,875 | B2 | 12/2006 | Rosenberg et al. | |
| 7,595,983 | B2 * | 9/2009 | Okuda ..................... | 361/679.56 |
| 7,627,351 | B2 * | 12/2009 | Rich et al. ..................... | 455/567 |
| 7,747,297 | B2 * | 6/2010 | Koibuchi et al. ........... | 455/575.4 |
| 7,933,123 | B2 * | 4/2011 | Wang et al. .............. | 361/679.56 |
| 8,014,142 | B2 * | 9/2011 | Prest et al. ................. | 361/679.3 |
| 8,217,908 | B2 * | 7/2012 | Gray ............................. | 345/173 |
| 8,493,722 | B2 * | 7/2013 | Chien et al. .............. | 361/679.21 |
| 2006/0114646 | A1 | 6/2006 | Koibuchi et al. | |
| 2009/0247237 | A1 * | 10/2009 | Mittleman et al. ............ | 455/567 |
| 2010/0156823 | A1 | 6/2010 | Paleczny et al. | |
| 2010/0156824 | A1 * | 6/2010 | Paleczny et al. .............. | 345/173 |
| 2011/0109571 | A1 * | 5/2011 | He et al. ........................ | 345/173 |
| 2012/0326568 | A1 * | 12/2012 | Liu et al. ....................... | 310/348 |
| 2013/0128417 | A1 * | 5/2013 | Wang et al. .............. | 361/679.01 |

FOREIGN PATENT DOCUMENTS

TW          201140397          11/2011

* cited by examiner

*Primary Examiner* — Lisa Lea Edmonds
*Assistant Examiner* — Keith Depew
(74) *Attorney, Agent, or Firm* — Jianq Chyun IP Office

(57) ABSTRACT

A handheld electronic device including a housing, a display module, a partition, a plurality of position posts, a plurality of first cushions and an actuator is provided. The housing has a first opening. The display module is located at the first opening of the housing and separated from the housing. The partition is located in and connected to the housing. The partition has a plurality of position holes. The position posts are connected with the display module and respectively located in the position hole. The first cushions are located in the position holes, and each of the fist cushions leans against the corresponding position post and the position hole. The actuator is disposed between the display module and the housing for forcing the display module to move relatively to the housing.

14 Claims, 12 Drawing Sheets

HANDHELD ELECTRONIC DEVICE

BACKGROUND OF THE INVENTION

1. Field of the Invention

The present application generally relates to a handheld electronic device, in particular, to a handheld electronic device with a vibration alert function.

2. Description of Related Art

In recent years, as the fast development of applications in the field of information technology and wireless mobile communications. Handheld electronic devices using a touch panel as an interface for user instruction input, such as mobile phones and tablet PCs, are gradually used in everyday life. Integrating a vibration mechanism in mobile phones or tablet PCs and providing vibration alert for incoming calls, or proving tactile feedback effects when the user operates via the touch panel, is a common feature of the current handheld electronic devices.

A common vibration mechanism for handheld electronic devices in the market usually uses an eccentric motor to force the housing or the main board. However, when the eccentric motor is used as the vibration source, inside space of the handheld electronic device is occupied, and surroundings of the eccentric motor must be cleared in order to reserve space when the motor rotates or to prevent the electronic elements from being damaged due to a short distance away from the motor. Hence, for a thin, light, short and small handheld electronic device, the space and the position for arranging the eccentric motor are always bottlenecks in the structural design.

SUMMARY OF THE INVENTION

Accordingly, the present application is directed to provide a handheld electronic device, which provides more three-dimensional and versatile vibration alert effects, and replaces the conventional eccentric motor as a source of vibration alert to save space for placing the eccentric motor and improve design flexibility.

The present application provides a handheld electronic device including a housing, a display module, a partition, a plurality of position posts, a plurality of first cushions and an actuator. The housing has a first opening. The display module is located at the first opening of the housing and separated from the housing. The partition is located in and connected to the housing. The partition has a plurality of position holes. The position posts are connected with the display module and located in the position holes respectively. The plurality of first cushions is located in the position holes, and each of the first cushions leans between the corresponding position post and position hole. The actuator is disposed between the display module and the housing for forcing the display module to move a displacement relative to the housing.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

Figure 1:
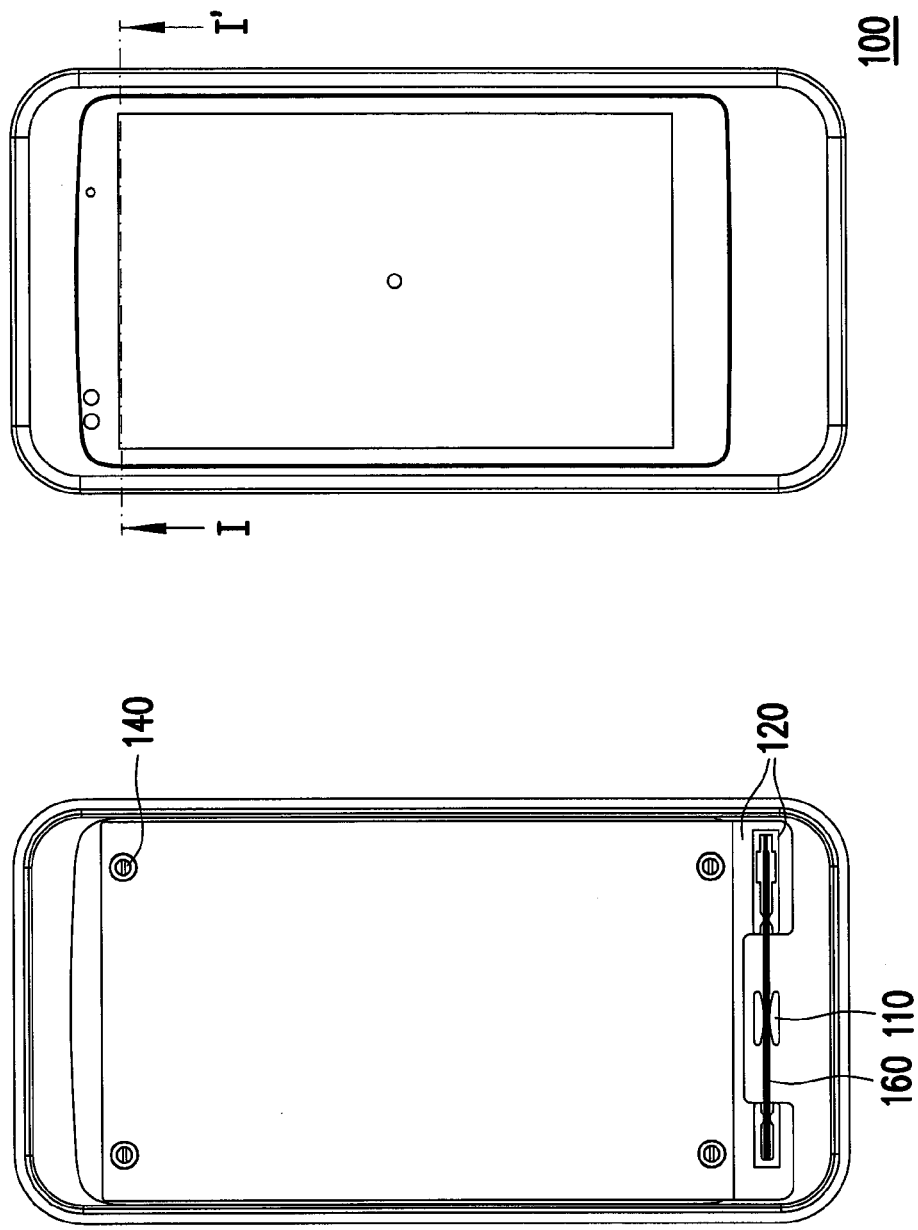
FIG. 1 is a schematic diagram of a handheld electronic device according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
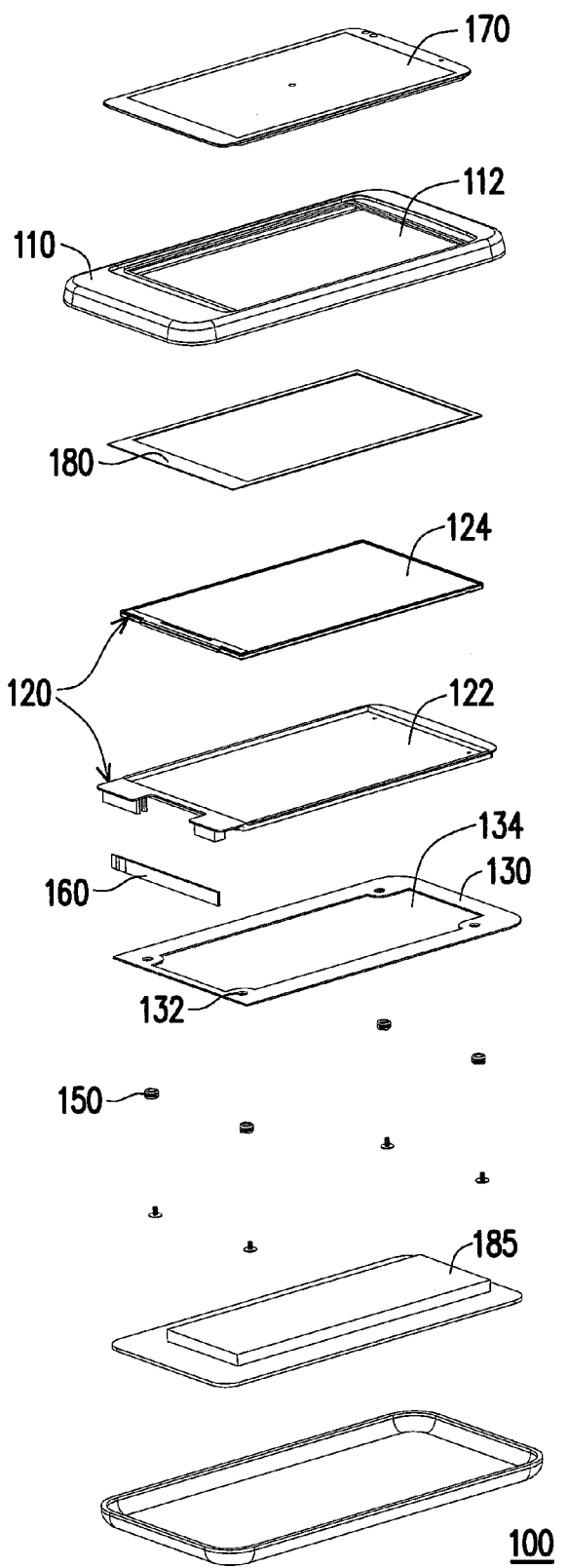
FIG. 2 is an exploded view of a handheld electronic device according to an embodiment of the present invention.
Figure 3:
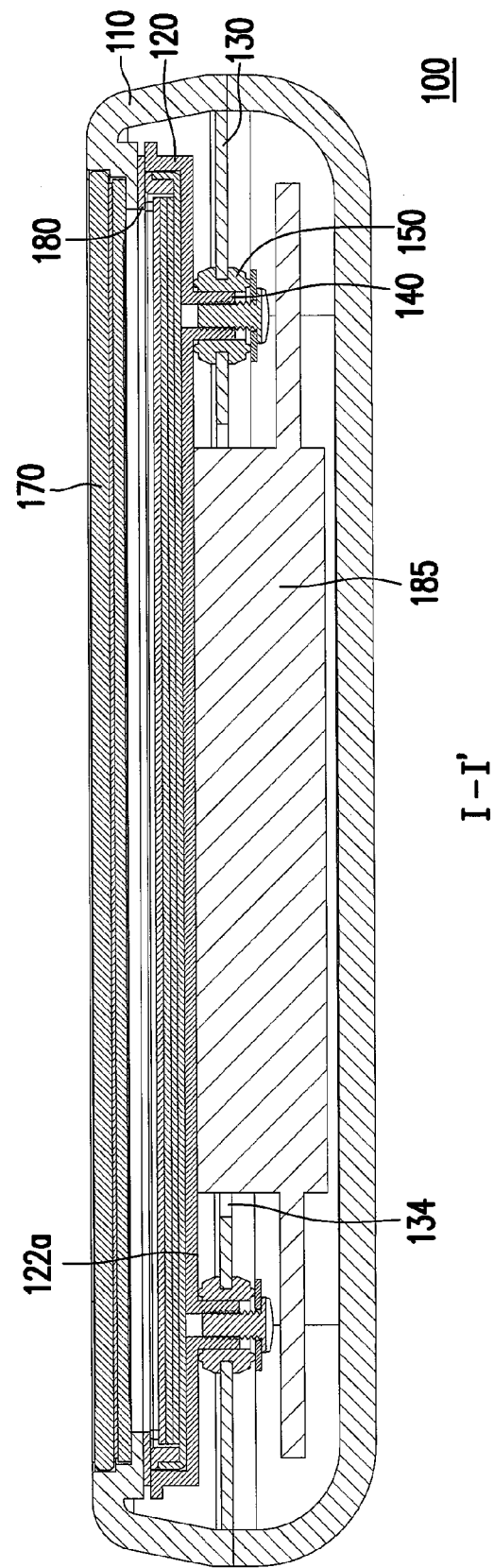
FIG. 3 is a cross-sectional view of a handheld electronic device along Line I-I' according to an embodiment of the present invention.

FIG. 1 is a schematic diagram of a handheld electronic device according to an embodiment of the present invention. FIG. 2 is an exploded view of the handheld electronic device according to FIG. 1. FIG. 3 is a cross-sectional view of the handheld electronic device in FIG. 1 along Line I-I'. Referring to FIG. 1 to FIG. 3, a handheld electronic device 100 including a housing 110, a display module 120, a partition 130, a plurality of position posts 140, a plurality of first cushions 150 and an actuator 160 is provided. The actuator 160 includes a piezoelectric element located between the display module 120 and the housing 110, in which the display module 120 and the housing 110 respectively lean against the actuator 160. When the handheld electronic device 100 receives an external instruction, such as a mobile phone incoming call or touch operation, the actuator 160 forces the display module 120 to move relative to the housing 110 to generate a vibration alert. The housing 110 has a first opening 112. The display module 120 is located at the first opening 112 of the housing 110, and separated from the housing 110. Besides, the display module 120 further includes a frame 122 and a display panel 124, and the display panel 124 is supported by the frame 122. The partition 130 is located in and connected to the housing 110 and the partition 130 further has a plurality of position holes 132. The position posts 140 are connected to the bottom 122a of the frame 122 of the display module 120, and the position posts 140 are respectively positioned in the position holes 132. The plurality of first cushions 150 are respectively located in the position holes 132 and between corresponding position posts 140 and position holes 132.

Figure 4:
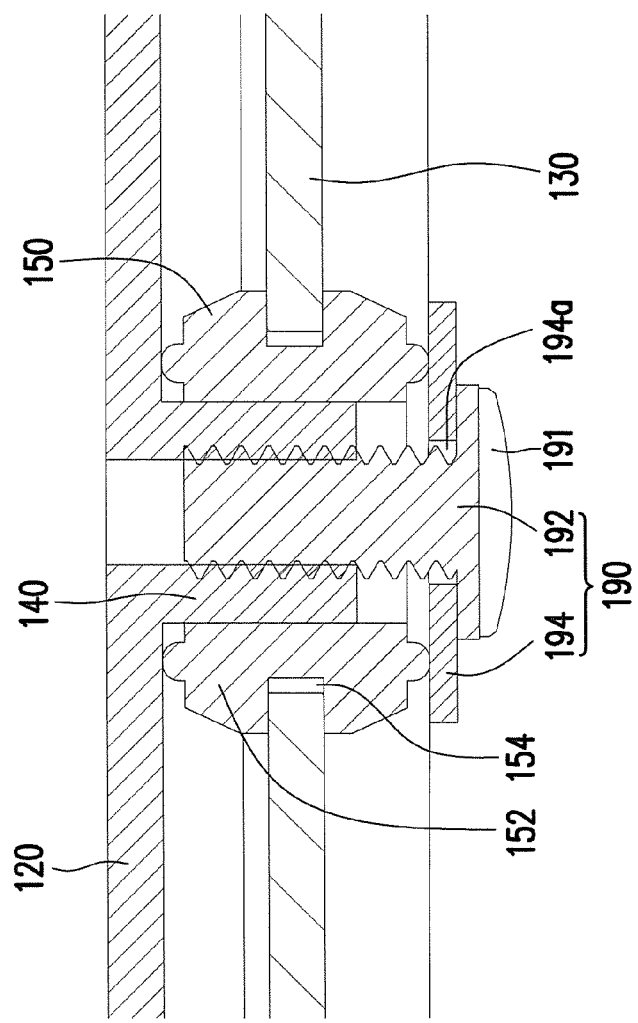
FIG. 4 is an enlarged view of the position posts and the first cushions of FIG. 3.

FIG. 4 is an enlarged view of the position posts 140, the first cushions 150 and the partition 130. Referring to FIG. 4, each of the first cushions 150, for example, is a washer 152 surrounding corresponding position post 140, and the washer 152 further has a groove 154 disposed on the lateral surface of the washer 152, and the partition 130 is engaged with the groove 154 via the position hole 132. The first cushions 150 may be made of elastic materials such as rubber or foam.

In addition, a locking member 190 may be arranged on one end of the position post 140, for locating the first cushion 150 to the position post 140. Each locking member 190 has a head portion 191 having an external diameter greater than that of the position post 140, and the display module 120 and the head portions 191 respectively lean against the top and bottom sides of the washers. Thus when the locking members 190 are locked to the position posts 140, the first cushions 150 can be fixed to the position posts 140 by the head portions 191 and the display module 120.

In this embodiment, the locking members 190 include screws 192 and pads 194, and the pad 194 has a through hole 194a. When the locking member 190 is locked to the position post 140, the screw 192 passes through the through hole 194a of the pad 194 and is locked to the position post 140, and the head portion 191 of the screw 192 is jointed on the pad 194 to fix the first cushion 150 via the pad 194. In addition, in other embodiments not shown herein, the pad 194 may be omitted. When the locking member 190 is locked to the position post 140, the first cushion 150 is fixed by the head portion 191 of the screw 192. When the display module 120 moves relatively to the housing 110, the first cushions 150 may allow and reduce the relative displacement between the display module 120 and the partition 130.

Referring to FIG. 3 again, the handheld electronic device 100 further includes a touch panel 170. Therefore, the design of this embodiment is further suitable for the touch control handheld electronic device 100, and the touch panel 170 is used as the interface for the user to input operating instructions. The touch panel 170 is located at the first opening 112 of the housing 110 and covering the display module 120, and the touch panel 170 is connected to the housing 110. A second cushion 180 is further arranged between the surrounding of the first opening 112 of the housing 110 and the display module 120, serving as a buffer and an interval between the housing 110 and the display module 120. When the display module 120 moves relatively to the housing 110, the second cushion 180 may allow and reduce the relative displacement between the display module 120 and the housing 110. The second cushion 180 may be made of elastic materials such as rubber or foam. Moreover, the housing 110 of the handheld electronic device 100 may further include an internal module 185, the partition 130 further includes a second opening 134, and through the second opening 134 of the partition 130, the internal module 185 leans against the display module 120. Here, the internal module 185 may be the main board of the handheld electronic device 100 and electronic elements of the main board, a metal shield case or a mechanical structural piece.

Figure 5:
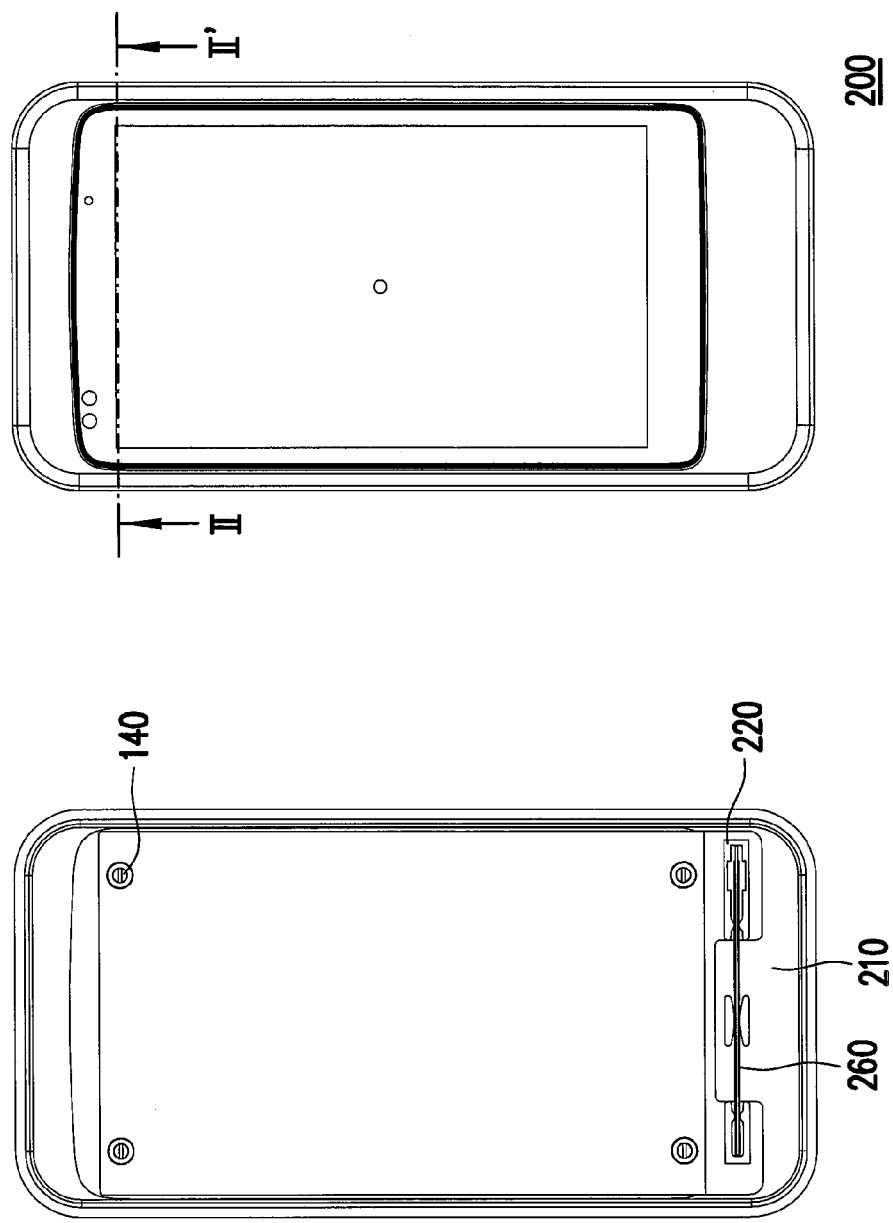
FIG. 5 is a schematic diagram of a handheld electronic device according to an embodiment of the present invention.
Figure 6:
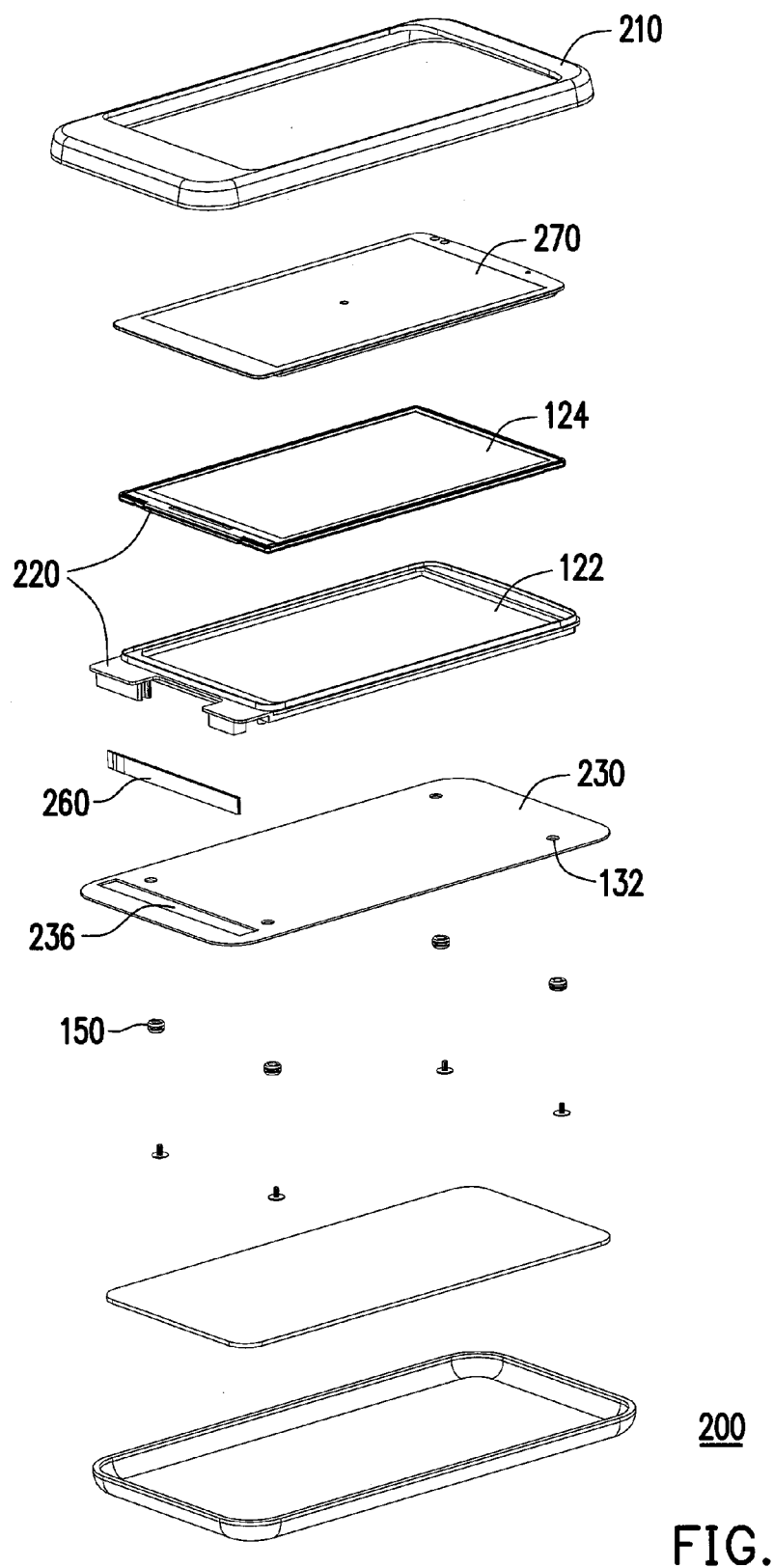
FIG. 6 is an exploded view of a handheld electronic device according to an embodiment of the present invention.
Figure 7:
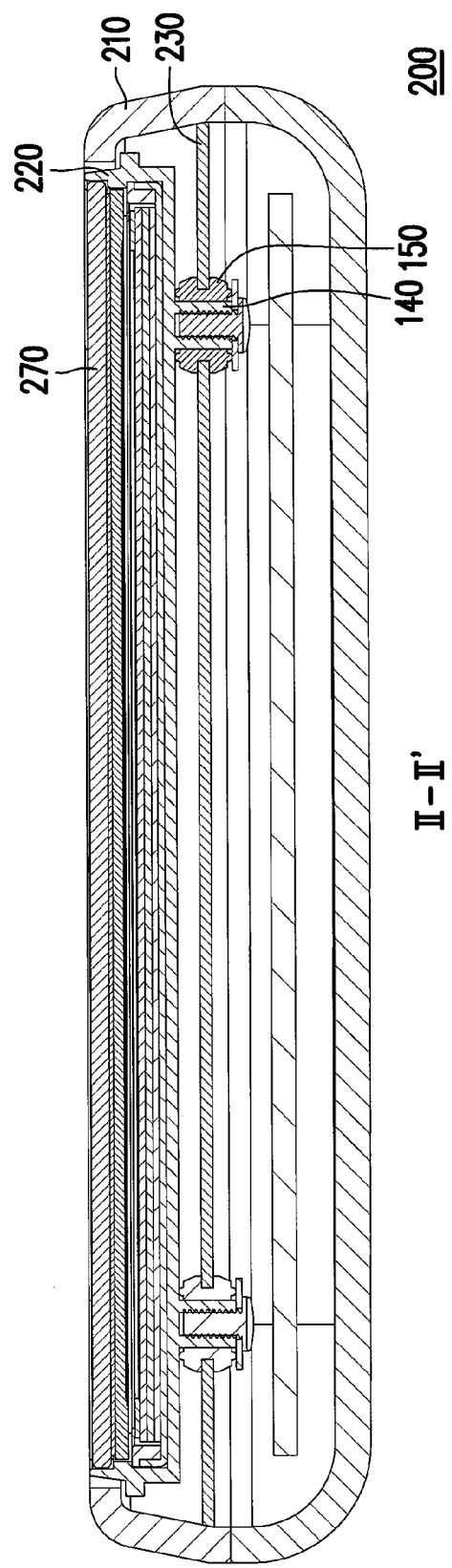
FIG. 7 is a cross-sectional view of a handheld electronic device along Line II-II' according to an embodiment of the present invention.

FIG. 5 is a schematic diagram of a handheld electronic device according to an embodiment of the present invention. FIG. 6 is an exploded view of the handheld electronic device in FIG. 5. FIG. 7 is a cross-sectional view of the handheld electronic device in FIG. 5 along Line II-II'. Referring to FIG. 5 to FIG. 7, the greatest difference in structure between this embodiment and the first embodiment is that in this embodiment, the touch panel 270 of the handheld electronic device 200 is connected to the display module 220 and separated from the housing 210. Besides, the partition 230 further includes a third opening 236, and the actuator 260 is located in the third opening 236. Other structural elements and the connection methods thereof which are not described in details are similar to those in the first embodiment.

Figure 8:
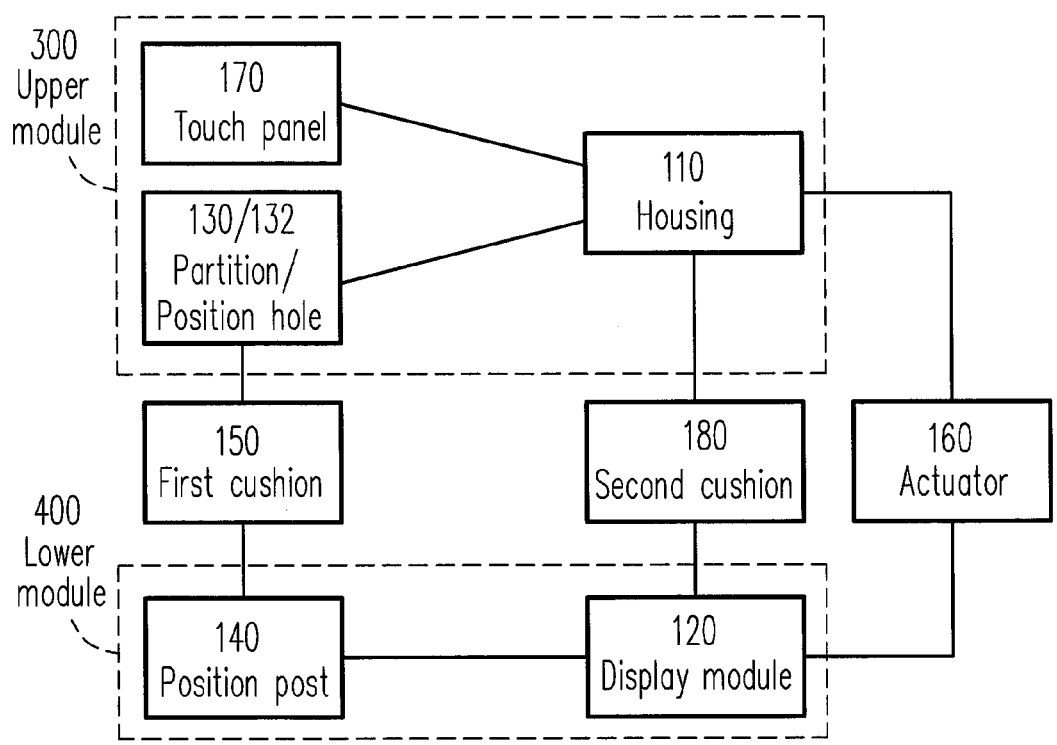
FIG. 8 is a schematic structural connection diagram according to an embodiment of the present invention.
Figure 9:
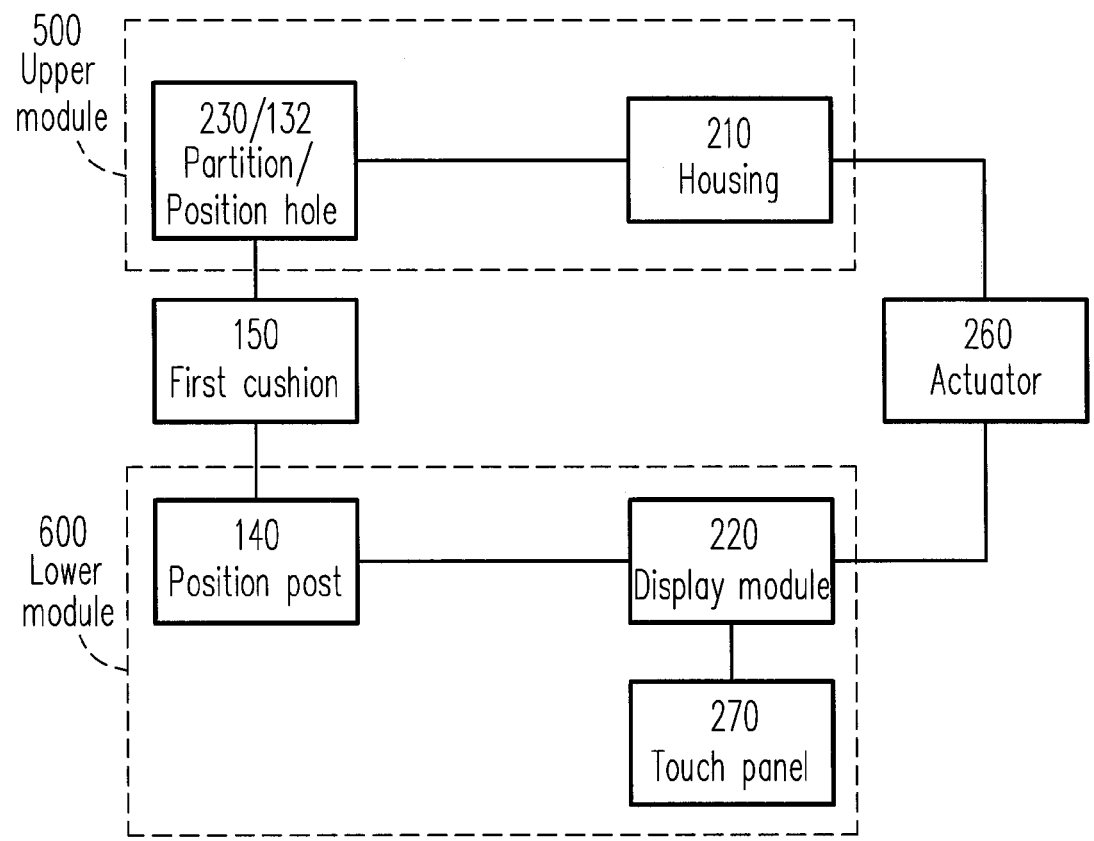
FIG. 9 is a schematic structural connection diagram according to an embodiment of the present invention.

FIG. 8 is a schematic structural connection diagram according to the embodiment in FIG. 3. Referring to FIG. 8, in this embodiment, the handheld electronic device 100 can be divided into an upper module 300 and a lower module 400 according to its structural connection. The touch panel 170 and the partition 130 both are connected to the housing 110, which can be seen as the upper module 300. The position posts 140 are connected to the display module 120, which can be seen as the lower module 400. The first cushions 150 between the partition 130 and the position posts 140 work as intervals, and a second cushion 180 arranged between around the first opening 112 of the housing 110 and the display module 120 works as an interval too. The actuator 160 can force the upper module 300 to move relatively to the lower module 400. FIG. 9 is a schematic structural connection diagram according to the embodiment in FIG. 7. Referring to FIG. 9, the housing 210 is connected to the partition 230, which can be seen as an upper module 500. The touch panel 270 and the position posts 140 are connected to the display module 220, which can be seen as a lower module 600. Thus, in this embodiment, the actuator 260 can force the upper module 500 to move relatively to the lower module 600 after the actuator 260 is enabled. Therefore, the present application can replace the conventional eccentric motor as a design to generate the vibration alert. In addition, by changing the connections between the structures, the ways of generating the vibration alert of the handheld electronic device change. In order to show how the actuator forces the display module to move relatively to the housing, the present application is specially described with reference to the following embodiments.

Figure 10A:
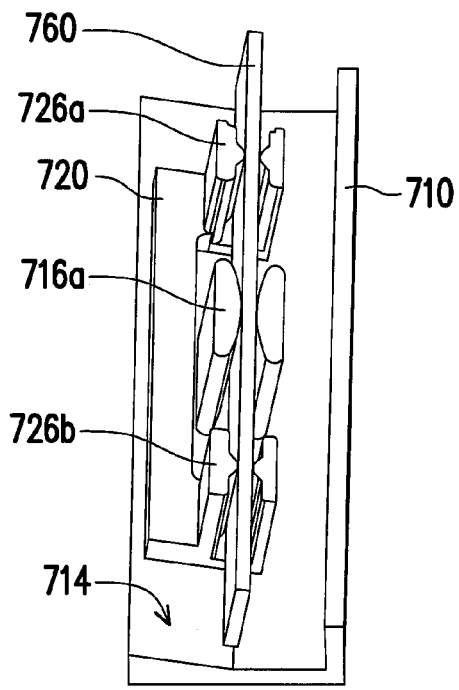
FIG. 10A is a schematic enlarged view of the actuator of the handheld electronic device positioned between the display module and the housing according to an embodiment of the present invention.
Figure 10B:
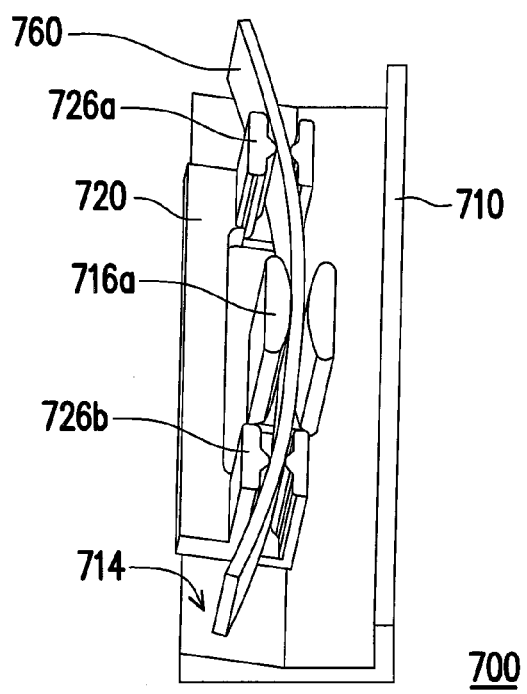
FIG. 10B is a schematic diagram of the actuator forcing the display module to move relative to the housing after the actuator is enabled according to an embodiment of the present invention.

FIG. 10A is an enlarged view of the actuator of the handheld electronic device disposed between the display module and the housing according to the present application. FIG. 10B is a schematic diagram that the actuator bends and forces the display module to move relative to the housing after the actuator is enabled. Referring to FIG. 10A and FIG. 10B, the housing 710 of the handheld electronic device 700 further includes a slope surface 714 leaning against the display module 720. Therefore, the housing 710 can move relatively to the display module 720 along the slope surface 714. The display module 720 includes a first clamping portion 726a and a second clamping portion 726b respectively clamping two ends of the actuator 760, while the housing 710 includes a third clamping portion 716a clamping the centre of the actuator 760. In FIG. 10B, the actuator 760 bends and forces the first clamping portion 726a and the second clamping portion 726b to move relatively to the third clamping portion 716a after the actuator 760 is enabled. In other words, the actuator 760 forces the display module 720 to move relatively to the housing 710 along the slope surface 714.

Figure 12A:
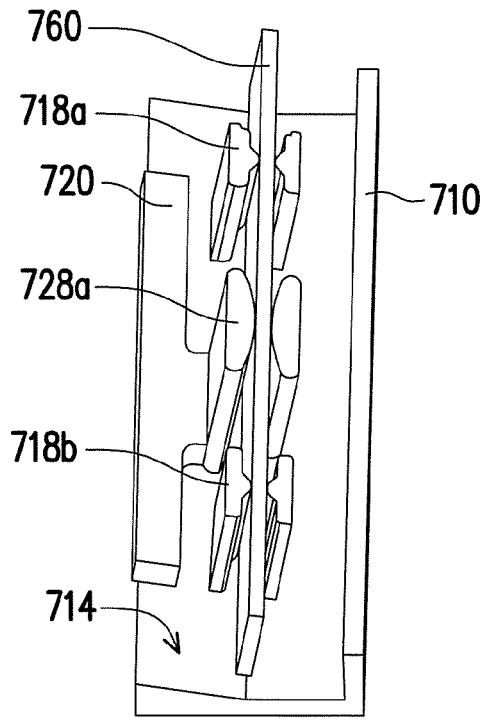
FIG. 12A is a schematic enlarged view of the actuator of the handheld electronic device positioned between the display module and the housing according to another embodiment of the present invention.
Figure 12B:
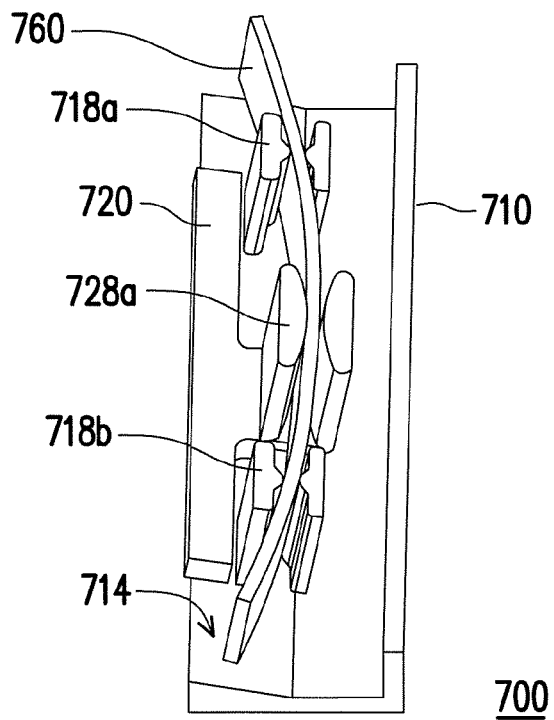
FIG. 12B is a schematic enlarged view of the actuator forcing the display module to move a displacement relative to the housing after the actuator is enabled according to another embodiment of the present invention.

On the contrary, in another embodiment shown in FIG. 12A and FIG. 12B, the display module 720 may also include only a fourth clamping portion 728a clamping the centre of the actuator. The housing 710 includes a fifth clamping portion 178a and a sixth clamping portion 178b respectively clamping two ends of the actuator 760. The actuator 760 bends and forces the fourth clamping portion 728a to move relative to the fifth clamping portion 178a and the sixth clamping portion 178b after the actuator 760 is enabled. Thus, the display module 720 and the housing 710 shift relatively to each other along the slope surface 714.

Figure 11:
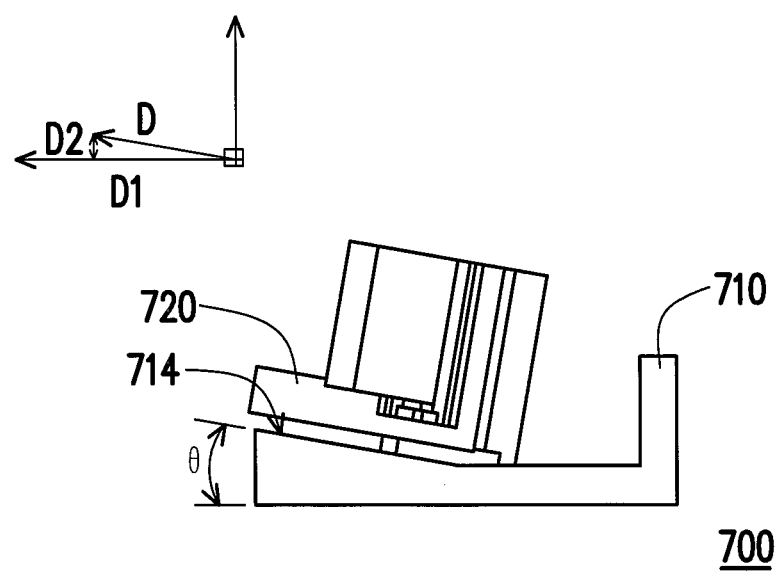
FIG. 11 is a side view of the actuator forcing the display module to move relative to the housing after the actuator is enabled according to an embodiment of the present invention.

FIG. 11 is a side view of the part structure in FIG. 10B. In this embodiment, when the handheld electronic device 700 receives an external instruction, the actuator 760 forces the display module 720 to move relatively to the housing 710, in which the display module 720 moves along the slope surface 714 with displacement D. The displacement D can be divided into a first displacement component D1 parallel to the housing 710 and a second displacement component D2 perpendicular to the housing 710.

To sum up, the handheld electronic device of the present application uses an actuator having a piezoelectric element based on the structural connections thereof, so that the actuator forces the display module to move relatively to the housing or the actuator forces the display module and the touch panel to move relatively to the housing to generate vibration alert. In this way, the present application can replace the conventional eccentric motor as the source of vibration alert to save space for placing the eccentric motor and improve design flexibility. In addition, in the present application, a slope surface may be arranged between the housing and the display module to provide a displacement component perpendicular to the display plane and a displacement component parallel to the display plane for producing three-dimensional vibration alert effects.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic device, comprising:
   a housing having a first opening;
   a display module located at the first opening of the housing and separated from the housing;
   a partition located in and fixed to the housing, the partition having a plurality of position holes, wherein the partition and the housing fixed together are regarded as an upper module;
   a plurality of position posts fixed to the display module and respectively located in the position holes, wherein the position posts and the display module fixed together are regarded as a lower module, and the lower module is separated from the upper module;
   a plurality of first cushions respectively located in the position holes and between the corresponding position post and the partition; and
   an actuator disposed between the display module and the housing for forcing the lower module constituted by the position posts and the display module to move relative to the upper module constituted by the housing and the partition.

2. The handheld electronic device according to claim 1, further comprising a touch panel located at the first opening and covering the display module.

3. The handheld electronic device according to claim 2, wherein the touch panel is connected to the housing.

4. The handheld electronic device according to claim 3, further comprising a second cushion disposed between the housing and the display module.

5. The handheld electronic device according to claim 2, wherein the touch panel is separated from the housing and connected to the display module.

6. The handheld electronic device according to claim 1, wherein the display module comprises a frame and a display panel, wherein the display panel is supported by the frame, and the position posts are connected to a bottom of the frame.

7. The handheld electronic device according to claim 1, further comprising an internal module located in the housing, wherein the partition has a second opening, and the internal module passes through the second opening and leans against the display module.

8. The handheld electronic device according to claim 1, wherein the actuator comprises a piezoelectric element.

9. The handheld electronic device according to claim 1, wherein the housing has a slope surface leaning against the display module, the actuator is for forcing the display module to move along the slope surface.

10. The handheld electronic device according to claim 1, wherein the display module comprises a first clamping portion and a second clamping portion respectively clamping two ends of the actuator, the housing comprises a third clamping portion clamping the centre of the actuator, and the actuator is enabled to force the third clamping portion to move relatively to the first clamping portion and the second clamping portion.

11. The handheld electronic device according to claim 1, wherein the display module comprises a fourth clamping portion clamping the centre of the actuator, the housing comprises a fifth clamping portion and a sixth clamping portion respectively clamping two ends of the actuator, and the actuator is enabled to force the fourth clamping portion to move relatively to the fifth clamping portion and the sixth clamping portion.

12. The handheld electronic device according to claim 1, wherein the partition further has a third opening, and the actuator is located in the third opening.

13. The handheld electronic device according to claim 1, wherein each of the first cushions comprises a washer surrounding corresponding position post, the washer has a groove formed on a lateral surface thereof, and the partition is engaged with the groove via the position post.

14. The handheld electronic device according to claim 13, further comprising a plurality of locking members respectively locked to an end of the position posts, and each of the locking members comprising a head portion, wherein an external diameter of the head portion is larger than that of the position post, and the display module and the head portion respectively lean against the upper and lower sides of the washer.

* * * * *